United States Patent [19]

Okabe et al.

[11] 3,898,159

[45] Aug. 5, 1975

[54] METHOD FOR REMOVING ANIONIC SURFACE ACTIVE COMPONENT FROM DRAINAGE

[75] Inventors: Akio Okabe, Tokyo; Tokio Ishii, Sakura, both of Japan

[73] Assignee: Lion Fat and Oil Co., Ltd., Tokyo, Japan

[22] Filed: Sept. 4, 1974

[21] Appl. No.: 502,912

Related U.S. Application Data

[63] Continuation-in-part of Ser. No. 486,808, July 9, 1974, abandoned, which is a continuation-in-part of Ser. No. 412,615, Nov. 5, 1973, abandoned, which is a continuation of Ser. No. 193,978, Oct. 29, 1971, abandoned.

[30] Foreign Application Priority Data

Oct. 30, 1971 Japan.................................. 46-95671
Oct. 29, 1971 Germany............................. 2154105

[52] U.S. Cl. ...................... 210/44; 210/63; 210/78

[51] Int. Cl. .......................................... B01d 21/01
[58] Field of Search ............. 210/37, 44, 63, 73, 78

[56] References Cited
UNITED STATES PATENTS

| | | | |
|---|---|---|---|
| 3,200,069 | 8/1965 | Eisenhauer | 210/63 |
| 3,238,127 | 3/1966 | Sebba | 210/44 |
| 3,297,532 | 1/1967 | Jones | 210/44 |
| 3,583,909 | 6/1971 | Block | 210/44 |
| 3,696,923 | 10/1972 | Miller | 210/44 X |

*Primary Examiner*—Charles N. Hart
*Assistant Examiner*—Robert H. Spitzer
*Attorney, Agent, or Firm*—Oblon, Fisher, Spivak, McClelland & Maier

[57] ABSTRACT

Anionic surface active components are separated from drainage or sewage streams by foam separation following reaction with a polyvalent metal ion. The polyvalent metal salt of surface active agent can be adsorbed onto the surface of the foam, in high concentration.

5 Claims, No Drawings

METHOD FOR REMOVING ANIONIC SURFACE ACTIVE COMPONENT FROM DRAINAGE

CROSS REFERENCE TO RELATED APPLICATIONS

This application is a continuation-in-part of application Ser. No. 486,808, filed July 9, 1974, now abandoned which is a continuation-in-part of Ser. No. 412,615, filed Nov. 5, 1973, now abandoned which is a continuation of Ser. No. 193,978, filed Oct. 29, 1971, now abandoned.

BACKGROUND OF THE INVENTION

1. Field of the Invention

This invention relates to a method for removing anionic surface active components from drainage or sewage streams. More particularly, this invention relates to a method for separating anionic surface active agents, and particularly detergents, by foam separation after conversion of the anionic surface active agents into water insoluble or difficultly soluble compounds.

2. Description of the Prior Art

The increased use of surface active agents, particularly as detergents and soaps, has created significant pollution difficulties from the point of view of adequate waste disposal. The treatment of fluid drainage containing large amounts of anionic surfactants has been a very serious problem because of the foams which are formed in drainage treating plants and when the drainage is discharged into rivers and because of the toxicity of the drainage to fish.

One method for removing these surface active agents from drainage and sewage streams has been to inject air into the streams so as to cause foaming whereby they can be removed by absorption. This technique, however, has several serious disadvantages. For one, it requires an undesirably extended period of time for complete removal of the surface active agents from the waste streams, which necessitates the use of large-size treating apparatus and containers. For another, the separated surface active agent solutions usually contain less than 5,000 ppm of the surface active agent so that the solution must be concentrated before it can be re-used or further disposed of. This means that additional concentration and storage towers must be supplied.

Still another difficulty with the prior art techniques is the necessity to break the foam in order to accomplish separation. Depending upon the particular surface active agent being recovered, breaking of the foam may be quite a difficult task.

Another method of separating surface active agents has been the removal of alkyl benzene sulfonates by the use of aluminum sulfate and activated carbon. In that process, however, not only large-scale treating apparatus is required, but the cost of recovery of the activiated carbon is undesirably costly.

SUMMARY OF THE INVENTION

Accordingly, it is one object of this invention to provide a highly efficient method for separating anionic surface active components from waste streams so as to diminish possible environmental pollution.

This and other advantages of this invention can be attained by admixing 0.5 – 10 mole equivalent of a polyvalent metal ion per 1 mole of anionic surface active component in the waste stream so as to convert the surface active component to an insoluble or difficulty soluble polyvalent salt thereof, and injecting a gas, such as air, into said stream to cause foaming, whereby said insoluble or difficultly soluble polyvalent salt of the surface active component is adsorbed.

DETAILED DESCRIPTION OF THE PREFERRED EMBODIMENTS

It has now been found that the disadvantages of the prior art can be overcome by converting the surface active components into insoluble or difficultly soluble polyvalent salts thereof, by reaction with water-soluble salts of alkaline earth metals, such as Mg, Ca, Ba and Al, Fe and Zn.

Suitable results are obtainable when the polyvalent metal ion is used in amounts of about 0.5 – 10 mole equivalent/mole of anionic surface active agent in the waste stream. Of course, if any compounds are contained in the waste stream which is reactive with the polyvalent metal ion, the quantity of polyvalent metal ion needed will be greater, depending upon the degree of consumption of the polyvalent metal ion.

The methods of this invention can be used for separating anionic surface active components from waste streams which contain a range of from 5 ppm to about 5,000 ppm of the anionic surface active components. Good results are obtainable, in particular, when the waste stream contains up to 3,000 ppm of the surface active components.

A wide variety of anionic surface active components can be separated by the methods of this invention such as sodium, potassium and ammonium salts of alkylbenzene sulfonate ($C_8 - C_{14}$); sodium, potassium and ammonium salts of alkane sulfonate ($C_8 - C_{24}$); sodium, potassium and ammonium salts of fatty alcohol sulfate ($C_8 - C_{24}$) and ethylene oxide adduct of fatty alcohol sulfate ($C_8 - C_{16}$); sodium, potassium and ammonium salts of fatty acid ($C_8 - C_{20}$).

The polyvalent metal ion can be provided by a water soluble compound which is capable of reacting with the anionic surface active component. Suitable polyvalent metal ions include the alkaline earth metal salts, e.g., Ca, Mg, Ba and other polyvalent metal salts, e.g., Al, Zn and Fe. The water soluble polyvalent metal compounds are introduced into the waste stream in amounts of 0.5 – 10 mole equivalents, preferably 1.5 – 5 mole equivalents per mole of the anionic surface active component with the above-mentioned proviso.

Suitable polyvalent metal compounds include the halides and nitrates of Mg, Ca, Ba, Al, Fe and Zn or the sulfates of Mg, Al, Fe and Zn or the hydroxides of Mg, Ca and Ba. These polyvalent salts will react with the anionic surface active components to form water-insoluble or difficultly soluble salts of said anionic surface active components usually in the form of a fine colloid.

It is necessary to adjust the pH of the solution to 4.0 – 5.5 after adding the polyvalent metal salt to the drainage.

If the drainage containing the polyvalent metal salt has a pH lower than 4.0 or higher than 5.5, the reaction resulting in the formation of water insoluble or difficultly-soluble material is not satisfactory. The foam resulting from the injection of a gas e.g., air into the drainage containing the polyvalent metal salt should be separable after retention for 2 – 15 minutes. If the retention time is less than 2 minutes, the resulting foam is quickly removed so that most of the drainage is removed from the system to give high loss.

The water insoluble or difficultly soluble salts can be separated by injecting a gas, such as air, into the waste stream to cause foaming. The foamed layer will contain high concentrations of the surface active component as compared to the liquid layer, so that separation can be accomplished within a short period of time.

It is preferable to add the polyvalent metal ion compound to the waste stream at or before the foam separation. Following separation, it is preferable to break the foam by heating, by centrifugal separation, or by mechanical means such as by use of a blower, ejector, cyclone or nozzle. The surface active components can thus be recovered in a cake-like form after breaking of the foam. Accordingly, the surface active components and other solid components can be recovered as a lower water content cake.

This method has been shown to be effective in removing as much as 99 percent or more of the anionic surface active components from waste streams, such as sewage or drainage streams. Moreover, it requires the use of only relatively small size apparatus, so that it can be adopted quite favorably to industrial utilization.

In accordance with the invention, it is possible to not only treat a drainage solution containing a low concentration of a surfactant, but also to treat a drainage solution containing a high concentration of a surfactant such as 5,000 ppm. The surfactant in the drainage can be effectively and easily removed, as the specific amount of the specific polyvalent metal salt is added. A part of the surfactant in the drainage is converted into water insoluble or difficultly soluble material by reacting it with the specific polyvalent metal salt, and the water insoluble or difficultly soluble material is floated with the foam resulting from the aeration of the remaining surfactant, and is separated from the drainage. In the operation, the polyvalent metal salt itself is water soluble and is included in the foam, so that the polyvalent metal salt reacts with the concentrated surfactant in the foam and the reaction of the polyvalent salt with the surfactant is further performed during the retention time. The liquid-solid separation is improved by the reaction in the foam and the separated solution is fed back to the drainage tank. Accordingly, the solution of the foam is concentrated and the reaction of the polyvalent metal salt with the concentrated surfactant is further improved, and the reaction of the polyvalent metal salt with the surfactant is completed by repeating the operation.

Having generally described the invention, a further understanding can be obtained by reference to certain specific Examples which are provided herein for purposes of illustration only and are not intended to be limiting in any manner.

EXAMPLE 1

Affect of phosphoric acid ion

Into a 5 liter reactor equipped with a foam outlet at the top, an air inlet at the bottom and a stirrer, 3 liters of water were charged. Thereafter, 0.78 mmol (0.26 mmole/l) of $Na_3PO_4$, 0.39 mmol (0.13 mmol/l) of sodium $C_{12}$ linear alkyl benzenesulfonate and 0.78 mmol (0.26 mmol/l) of $Al_2(SO_4)_3$ were added and the solution was adjusted to give a pH of 5.0.

Air was injected into the solution from the inlet at a feed rate of 1 liter/min. until the discharge of the foam was stopped. The same process was repeated except that the addition $Na_3PO_4$ was deleted.

The results are shown in the Table.

TABLE

|  | $Na_3PO_4$ addition | no $Na_3PO_4$ |
|---|---|---|
| Concentration of surfactant in treated drainage (mmol/l) | 0.012 | 0.0020 |
| Concentration of $PO_4$ ion in treated drainage (mmol/l) | 0.085 | — |
| Discharged foam solution (l) | 1.587 | 0.033 |
| Concentration of surfactant in the discharged foam solution (mmol/l) | 0.23 | 11.41 |
| Reaction rate of surfactant and $Al_2(SO_4)_3$ (%) | 57.2 | 98.2 |
| Time for treating (min.) | 16 | 7 |

EXAMPLE 2

A 50 m³ quantity of a waste stream containing 21 ppm of sodium $C_{12}$ alkylbenzene sulfonate, and having a pH of 6.2 discharged from a factory was admixed with 1.4 kg of aluminum sulfate in a 30 m³ reactor and the pH was adjusted to 4.8. Air was injected at a feed rate of 4 m³/min.

The foam was discharged. The foam discharged from the reactor was separated into a solid material and water. The separated water was recycled to the reactor.

The average retention of time of the foam layer was 5 minutes. After 15 minutes, the treated water discharged was tested. As a result, the discharged drainage contained 0.2 ppm of the surfactant. The recycled solution was 35 kg (0.18%).

EXAMPLE 3

500 cc of a waste stream containing 345 ppm of sodium dodecylbenzene sulfonate (hereinafter referred to as ABS) was admixed with 0.1 g (2 mole/1 mole of ABS) of magnesium chloride, and then air was injected at the rate of 2 l/min. for about 15 minutes to cause foaming.

The foam was separated from the liquid phase. The concentration of the ABS in the remaining solution was 5 ppm, while the concentration of ABS in the foam was 20,000 ppm.

When the process was repeated, except without the magnesium chloride, the concentration of the ABS remaining in the liquid was 100 ppm, after about 30 minutes operation, and the concentration of ABS in the foam was 1,500 ppm.

From this, it should be clear that the surface active components in the drainage can be removed with a high degree of efficiency.

When the process was repeated using other polyvalent metal compounds, instead of magnesium chloride, the following results were obtained:

| Compound | Concentration of ABS remaining in the solution (ppm) | Concentration of ABS in foam (ppm) | Time for injecting air (min.) |
|---|---|---|---|
| Calcium chloride | 5 | 20,000 | 15 |
| Ferric chloride | 10 | 20,000 | 20 |
| Aluminum sulfate | 3 | 13,000 | 12 |
| Zinc chloride | 20 | 30,000 | 30 |

EXAMPLE 4

In accordance with the operation of Examples 2 and 3, waste streams containing the following concentrations of surface active component were treated. As a reference, the same operation was repeated without the use of calcium chloride.

Surface active component in the drainage:
sodium α-olefin sulfonate ($C_{15} - C_{18}$)
Additive: calcium chloride (2 mole per 1 mole of surface active component in the drainage)
Air injection: 10 min.

| Concentration of surface active component in drainage (ppm) | Concentration of surface active component after treatment (ppm) | |
|---|---|---|
| | Invention | Reference |
| 100 | 2 | 40 |
| 1,000 | 7 | 380 |
| 2,000 | 10 | 1,100 |
| 3,000 | 10 | 1,350 |
| 4,000 | 22 | 2,060 |
| 5,000 | 35 | 3,000 |

Having fully described the invention, it will be apparent to one of ordinary skill in the art that many changes and modifications can be made without departing from the spirit or scope of the invention.

What is claimed as new and intended to be covered by Letters Patent is:

1. A method for removing an anionic surface active component from a waste stream, which comprises: admixing a polyvalent metal ion selected from the group consisting of $Ca^{++}$, $Mg^{++}$, $Ba^{++}$, $Zn^{++}$, $Fe^{++}$, $Al^{+++}$, and $Fe^{+++}$ with a waste stream substantially free of phosphate ion in amounts of 0.5 – 10 mole equivalent of said polyvalent metal ion per mole of anionic surface active component in said waste stream and adjusting the pH of said waste stream between 4.0 to 5.5 so as to form water insoluble or difficultly soluble polyvalent salts of said anionic surface active components, injecting air into the mixture to cause foaming thereof, whereby said salts are absorbed into the foam and thereafter separating said foam.

2. The method of claim 1, wherein said anionic surface active component is contained in said waste stream at a concentration of 5 – 5,000 ppm.

3. The method of claim 1, wherein said polyvalent metal ion is provided by a water soluble compound of said polyvalent metal ion.

4. The method of claim 1, wherein said foam is broken by centrifugal separation to yield a low water content cake containing said surface active component salts.

5. The method of claim 1, wherein said anionic surface active components are selected from the group consisting of the alkali or ammonium salts of alkylbenzene sulfonate, alkane sulfonate, alkene sulfonate, fatty alcohol sulfate, fatty acids, ethylene oxide adducts of fatty alcohol sulfate and ethylene oxide adducts of alkyl phenol sulfate.

* * * * *